(12) United States Patent
Caldwell

(10) Patent No.: US 9,494,931 B2
(45) Date of Patent: Nov. 15, 2016

(54) DYNAMIC HYPERLINKS FOR PROCESS CONTROL SYSTEMS

(75) Inventor: John M. Caldwell, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 461 days.

(21) Appl. No.: 12/565,275

(22) Filed: Sep. 23, 2009

(65) Prior Publication Data

US 2011/0072338 A1 Mar. 24, 2011

(51) Int. Cl.
*G06F 17/00* (2006.01)
*G05B 19/418* (2006.01)
*G06F 17/22* (2006.01)
*G06F 17/30* (2006.01)
*G06F 21/62* (2013.01)

(52) U.S. Cl.
CPC ..... *G05B 19/41845* (2013.01); *G06F 17/2235* (2013.01); *G06F 17/30014* (2013.01); *G06F 21/6218* (2013.01); *G05B 2219/32126* (2013.01); *G06F 2221/2111* (2013.01); *Y02P 90/16* (2015.11)

(58) Field of Classification Search
CPC ................................................ G06F 17/30014
USPC ........................................................ 715/205
See application file for complete search history.

(56) References Cited

U.S. PATENT DOCUMENTS

| | | | | |
|---|---|---|---|---|
| 5,809,317 A | * | 9/1998 | Kogan | G06F 17/30014 707/999.1 |
| 5,838,563 A | * | 11/1998 | Dove et al. | 700/83 |
| 6,088,707 A | * | 7/2000 | Bates et al. | 715/235 |
| 6,122,647 A | * | 9/2000 | Horowitz et al. | 715/205 |
| 6,157,943 A | | 12/2000 | Meyer | |
| 6,201,996 B1 | * | 3/2001 | Crater | G05B 19/0421 700/69 |

(Continued)

FOREIGN PATENT DOCUMENTS

| | | |
|---|---|---|
| GB | 2 430 499 A | 3/2007 |
| WO | WO-99/63409 A1 | 12/1999 |

(Continued)

OTHER PUBLICATIONS

Chinese Office Action for Application No. CN 201010293630.4, dated Jan. 30, 2014.

(Continued)

*Primary Examiner* — Mustafa Amin
(74) *Attorney, Agent, or Firm* — Marshall, Gerstein & Borun LLP

(57) ABSTRACT

Methods and systems for providing knowledge access in a process control system and methods and systems for providing dynamic hyperlinks in a process control system are disclosed. A dynamic hyperlink may define an association between a process control object corresponding to a process control element and a knowledge object corresponding to a knowledge reference stored internally or externally to the process control system. At a run-time of a display view that includes the process control object, the defined dynamic hyperlink may be established without a configuration or a download. Upon selection of the defined dynamic hyperlink, the corresponding knowledge reference may be displayed. Defined dynamic hyperlinks may be stored in a process control system database independent of process control objects or knowledge objects. Embodiments of user interfaces for administrating dynamic hyperlinks are also disclosed.

34 Claims, 10 Drawing Sheets

(56) References Cited

U.S. PATENT DOCUMENTS

| | | | |
|---|---|---|---|
| 6,370,569 B1 | 4/2002 | Austin | |
| 6,654,892 B1* | 11/2003 | Karim | 726/11 |
| 6,691,280 B1* | 2/2004 | Dove et al. | 715/210 |
| 6,757,568 B2 | 6/2004 | Birzer et al. | |
| 6,799,195 B1 | 9/2004 | Thibault et al. | |
| 6,931,288 B1 | 8/2005 | Lee et al. | |
| 7,010,742 B1* | 3/2006 | Hsu et al. | 715/208 |
| 7,010,752 B2 | 3/2006 | Ly | |
| 7,089,530 B1 | 8/2006 | Dardinski et al. | |
| 7,127,720 B2 | 10/2006 | Cano et al. | |
| 7,162,534 B2 | 1/2007 | Schleiss et al. | |
| 7,191,400 B1 | 3/2007 | Buvac et al. | |
| 7,194,469 B1* | 3/2007 | Dowd et al. | |
| 7,216,007 B2 | 5/2007 | Johnson | |
| 7,234,138 B2 | 6/2007 | Crevatin | |
| 7,275,066 B2* | 9/2007 | Priestley | 707/800 |
| 7,299,158 B2 | 11/2007 | Behkami et al. | |
| 7,337,013 B2 | 2/2008 | Dove et al. | |
| 7,406,659 B2* | 7/2008 | Klein et al. | 715/273 |
| 7,599,748 B2 | 10/2009 | Dove et al. | |
| 7,797,271 B1* | 9/2010 | Bonneau et al. | 705/343 |
| 7,890,850 B1* | 2/2011 | Bryar et al. | 715/207 |
| 7,966,654 B2* | 6/2011 | Crawford | 726/11 |
| 2002/0059335 A1* | 5/2002 | Jelbert | 707/500 |
| 2002/0069223 A1* | 6/2002 | Goodisman et al. | 707/513 |
| 2003/0103071 A1 | 6/2003 | Lusen et al. | |
| 2003/0182168 A1 | 9/2003 | Lyons | |
| 2003/0195934 A1 | 10/2003 | Peterson et al. | |
| 2004/0044550 A1* | 3/2004 | Self et al. | 705/7 |
| 2004/0068527 A1* | 4/2004 | Smith, III | 707/204 |
| 2004/0162887 A1 | 8/2004 | Dillon et al. | |
| 2004/0230643 A1 | 11/2004 | Thibault et al. | |
| 2004/0230899 A1 | 11/2004 | Pagnano et al. | |
| 2004/0249651 A1 | 12/2004 | Fischer et al. | |
| 2004/0261041 A1 | 12/2004 | Parakkuth et al. | |
| 2005/0040223 A1 | 2/2005 | Yigit et al. | |
| 2005/0050032 A1* | 3/2005 | Lee | 707/3 |
| 2005/0091027 A1 | 4/2005 | Zaher et al. | |
| 2005/0120292 A1* | 6/2005 | Suzuki | 715/501.1 |
| 2006/0133412 A1 | 6/2006 | Callaghan | |
| 2006/0212823 A1 | 9/2006 | Bhagat et al. | |
| 2006/0218501 A1 | 9/2006 | Wilson et al. | |
| 2006/0235951 A1 | 10/2006 | Edwards et al. | |
| 2006/0239248 A1 | 10/2006 | Hawk et al. | |
| 2007/0067725 A1 | 3/2007 | Cahill et al. | |
| 2007/0076724 A1 | 4/2007 | Hall et al. | |
| 2007/0079250 A1* | 4/2007 | Bump et al. | 715/762 |
| 2007/0112823 A1* | 5/2007 | Baatz et al. | 707/101 |
| 2007/0118893 A1 | 5/2007 | Crawford | |
| 2007/0211079 A1 | 9/2007 | Nixon et al. | |
| 2007/0233664 A1 | 10/2007 | Hardin et al. | |
| 2007/0285721 A1 | 12/2007 | Sato | |
| 2008/0005129 A1 | 1/2008 | Herberth | |
| 2008/0022195 A1 | 1/2008 | Lyle et al. | |
| 2008/0040477 A1 | 2/2008 | Johnson et al. | |
| 2008/0040678 A1* | 2/2008 | Crump | 715/763 |
| 2008/0046104 A1 | 2/2008 | Van Camp et al. | |
| 2008/0046490 A1 | 2/2008 | Williams et al. | |
| 2008/0049971 A1* | 2/2008 | Ramos et al. | 382/100 |
| 2008/0052632 A1 | 2/2008 | Thibault et al. | |
| 2008/0059977 A1* | 3/2008 | Brown et al. | 719/316 |
| 2008/0097622 A1 | 4/2008 | Forney et al. | |
| 2008/0127092 A1 | 5/2008 | Tomar | |
| 2008/0133404 A1* | 6/2008 | Bascom | 705/39 |
| 2008/0134215 A1 | 6/2008 | Thibault et al. | |
| 2008/0136833 A1 | 6/2008 | Taniguchi et al. | |
| 2008/0148172 A1 | 6/2008 | Dove et al. | |
| 2008/0155444 A1 | 6/2008 | Pannese et al. | |
| 2010/0070448 A1* | 3/2010 | Omoigui | 706/47 |
| 2010/0223247 A1* | 9/2010 | Wurzer | 707/706 |
| 2010/0268739 A1* | 10/2010 | Zalepa | 707/782 |
| 2010/0274859 A1* | 10/2010 | Bucuk | 709/206 |
| 2010/0287155 A1* | 11/2010 | Reisman | 707/709 |
| 2010/0332993 A1* | 12/2010 | Bousseton et al. | 715/738 |
| 2012/0030264 A1* | 2/2012 | Horn | 707/829 |

FOREIGN PATENT DOCUMENTS

| | | |
|---|---|---|
| WO | WO-2004/012020 A1 | 2/2004 |
| WO | WO-2004/053608 A1 | 6/2004 |

OTHER PUBLICATIONS

Second Chinese Office Action for Application No. CN 201010293630.4, dated Oct. 8, 2014.
Examination Report for Application No. GB1015890.5 dated Jul. 9, 2015.
Third Office Action for Application No. 201010293630.4 dated Apr. 22, 2015.
Examination Report for GB1015890.5 dated Jan. 22, 2016.
Fourth Office Action for Application No. CN 201010293630.4 dated Nov. 6, 2015.

* cited by examiner

Possible Process Control Objects for Dynamic Hyperlinks — 205

- Areas
- Units
- Modules/Blocks
- Tags
- Display Objects
- Charts
- Alarms
- Equipment
- Control Network Nodes
- Devices
- Displays
- Events

Possible Knowledge References for Dynamic Hyperlinks — 215

- All device reference material (Product Data Sheets, Spec Sheets, Operating Manuals, Service Manuals, etc.)
- Customer material including documents (SOP, Incident Reports, Safety Manuals, Best Practices, etc.), and drawings (loop sheets, P&IDs, pictures, training videos, etc.)
- Operator Logbook Entries (Notes, Work Orders, Incidents, etc.)
- Control System Help Topics
- Process Control Objects (Displays, Charts, etc.)

| ENTRY ID | Process Control Object | Knowledge Reference Object | Expiration | Access Permission | Other Attributes |
|---|---|---|---|---|---|
| 0001 | ACME Valve Model 402B  418 | ACME Valve Model 402B Product Data Sheet  420 | 6 months | Group A | |
| 0002 | ACME Valve Model 402B Serial # 12345 | ACME Valve Model 402B Product Data Sheet | 6 months | Group A | |
| 0003 | ACME Valve Model 402B Serial # 67890 | ACME Valve Model 402B Product Data Sheet | 6 months | Group A | |
| ... | ... | ... | ... | ... | |
| 0789 | Display View # 76 | Standard Operating Procedure # 463 | None | None | |

*FIG. 4*

DYNAMIC HYPERLINKS FOR PROCESS CONTROL SYSTEMS

FIELD OF THE DISCLOSURE

The present disclosure generally relates to knowledge reference access in process control systems, and in particular, to systems and methods for providing and using dynamic hyperlinks for knowledge reference access in process control systems.

BACKGROUND

Process control systems, such as those used in chemical, petroleum or other processes, generally include a centralized process controller communicatively coupled to one or more field devices which may be, for example, valve positioners, switches, sensors (such as temperature, pressure and flow rate sensors), etc. These field devices perform physical control functions within the process (such as opening or closing a valve), take measurements within the process for use in controlling the operation of the process, or perform any other desired function within the process. Generally speaking, the process controller receives signals indicative of measurements made by one or more field devices and/or other information pertaining to the field devices, uses this information to implement a control routine and then generates control signals which are sent via the buses to the field devices to thereby control the operation of the process.

Information from the field devices and the controller is usually made available over a data highway to one or more other hardware devices, such as operator workstations, personal computers, data historians, report generators, centralized databases, etc., typically placed in control rooms or other locations away from the harsher plant environment. These hardware devices run applications that may, for example, enable an operator to perform functions with respect to the process, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc.

With digital based control and communication, information pertaining to a device or an application (such as a software program) may be made available to a user or operator in some standardized format within the control programming environment. For example, the information may be made available to the user via a uniform resource locator (URL) or hyperlink that provides an automatic link or connection to further documentation or a further application. The URL or hyperlink may be embedded in computerized documentation for a process control element corresponding to the device or application, such as within the description field of the process control element. With the URL or hyperlink, a user or an operator can easily access related documentation or a related application for the process control element by merely selecting the URL.

Additionally, the hyperlink or URL may include a generalized field. When the hyperlink or URL is selected, the generalized field may be replaced with some information pertaining to the process control element, such as the name or location of the process control element or the name of a containing element (such as a process area or a node) of the process control element. In this manner, process control elements may be copied, renamed and changed without having to change the URL(s) provided in the documentation associated therewith.

Current URLs and hyperlinks that are associated with process control elements in a process control system, however, are generally statically defined. That is, current URLs or hyperlinks must be defined in the process control system during configuration. If a new or modified URL or hyperlink is desired, a re-configuration or download must occur for the new or modified URL to be accessible within the process control system.

Moreover, not only does a statically defined URL or hyperlink require definition during configuration, but it also requires a separate definition for each separate instance of occurrence of the corresponding process control element. For example, a static URL may defined to link a specific standard operation procedure (SOP) document to a specific device in a first display view, but additional static URLs must be each separately defined and configured in order to link the same SOP to the same specific device for all other display views that include the specific device.

SUMMARY OF THE DISCLOSURE

According to the present disclosure, a dynamic URL or dynamic hyperlink in a process control system may be defined to link or associate a process control element with a knowledge reference or other process control object. Once defined, the dynamic hyperlink may be established at a run-time of any display view that includes a representation of a process control element. Thus, a single, initial definition of the dynamic hyperlink may result in the dynamic hyperlink being automatically available on any opened display view that includes the process control element. A user may easily access the knowledge reference associated with the process control element by simply selecting the dynamic hyperlink on the display view.

The dynamic URL or hyperlink may be established (and modified or re-established) each time a display view that includes the process control element is built, without a process control system configuration change or download. This dynamic establishment of hyperlinks may be enabled by a centralized dynamic hyperlink database. The centralized dynamic hyperlink database may store definitions of all dynamic URLs or dynamic hyperlinks in the process control system that are available or "live." The centralized dynamic hyperlink database may be centrally accessible, and may typically be physically and/or logically independent of configuration databases in the process control system.

Each entry of the centralized dynamic hyperlink database may define a different hyperlink or URL. The URL or hyperlink definition may include an association of a process control object to a knowledge object. The process control object may correspond to a process control entity in the system, and the knowledge object may correspond to a knowledge reference accessible by the system. The entry may be stored independently (either physically, logically or both) from storage locations of the process control object, the knowledge reference, and/or the knowledge object. At the run-time of a display view that includes the process control object, the dynamic hyperlink may be established based on a corresponding entry in the centralized dynamic hyperlink database, and the dynamic hyperlink may be displayed on the display view. Upon a user selection of the displayed hyperlink, the corresponding knowledge reference may be displayed.

A dynamic hyperlink may have an expiration time or an expiration time interval. After expiration, a corresponding entry in the dynamic hyperlink may be deleted from the centralized dynamic hyperlink database and from any visible display view. The dynamic hyperlink may have other additional or alternative attributes as well.

Properties of the centralized dynamic hyperlink database are disclosed herein. Methods of providing dynamic hyperlinks or dynamic URLs in a process control system display are disclosed, and methods and systems of providing access to knowledge references in a process control system are also disclosed. The methods and systems may include user interfaces for administrating dynamic hyperlinks, among other aspects.

BRIEF DESCRIPTION OF THE DRAWINGS

FIG. 2 illustrates possible knowledge references and possible process control objects in a process control system that may be used in conjunction with dynamic hyperlinks;

FIG. 4 shows an embodiment of a dynamic hyperlink database;

DETAILED DESCRIPTION

Figure 1:
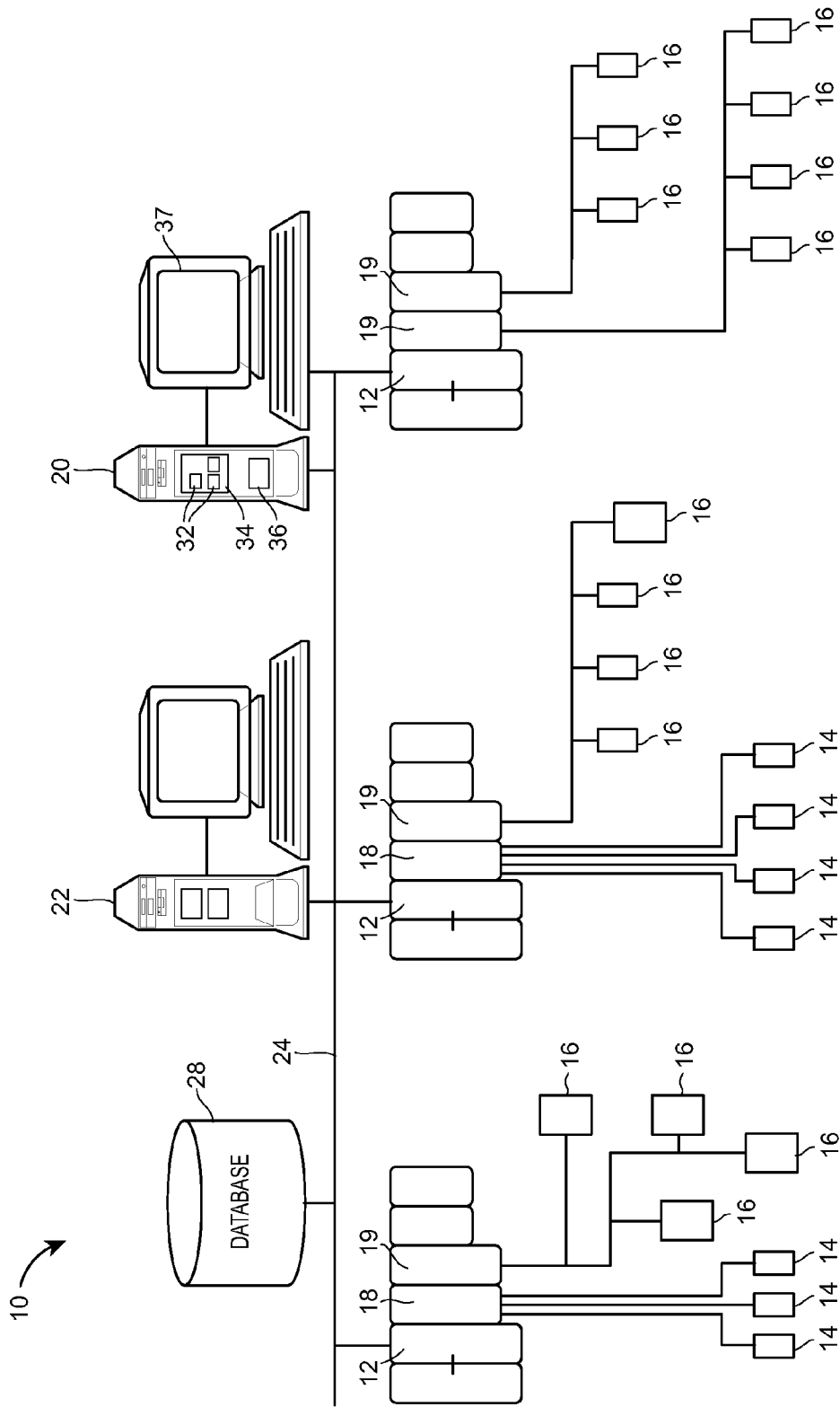
FIG. 1 is block diagram of an exemplary distributed process control system in a process control plant.

FIG. 1 illustrates an example of a process plant 10. The process plant 10 includes a distributed process control system having one or more process controllers 12, which may be a pair of redundant controllers. Each process controller 12 is connected to one or more field devices 14 and 16 via input/output (I/O) cards or devices 18 and 19, which may be any types of I/O devices conforming to any desired communication or controller protocol. The field devices 14 and 16 may be any types of field devices such as, for example, sensors, valves, transmitters, positioners, etc., and may conform to any desired open, proprietary, or other communication or programming protocol.

The process plant 10 also includes one or more host workstations, computers, or user interfaces 20 and 22 (which may be any type of personal computers, workstations, etc.) that are accessible by plant personnel such as configuration engineers, process control operators, maintenance personnel, etc. The user interfaces 20 and 22 are coupled to the process controllers 12 via a communication line or bus 24. The communication bus 24 may be implemented using any desired hardwired or wireless communication structure, and using any desired or suitable communication protocol such as, for example, an Ethernet protocol. In some embodiments, the computing devices 20 and 22 may be remotely located from the process plant itself and may communicate over a public or a private network. The process controllers 12, the I/O devices 18 and 19, and the field devices 14 and 16 generally make up the process control system.

In addition, a database 28 may be connected to the communication bus 24, and operates as a data historian that collects and stores parameter, status and other data associated with the process controllers 12 and field devices 14 and 16 within the plant 10. Alternatively, or in addition, the database 28 may operate as a configuration database that stores the current configuration of the process control system within the plant 10 (and configuration data related thereto) used by the process controllers 12 and the workstations 20, 22. The database 28 may also serve as a data historian by collecting and storing data generated in the process plant 10 for future use. Although FIG. 1 illustrates only one database 28, multiple databases are possible, such as an event historian database and a continuous process historian database.

While the process controllers 12, the I/O devices 18 and 19 and the field devices 14 and 16 are typically located down within and distributed throughout the sometimes harsh plant environment, the user interfaces 20 and 22 and the database 28 are usually located in control rooms or other less harsh environments easily assessable by operators or maintenance personnel.

As is known, each of the process controllers 12, which may be for example, the DeltaV™ controller sold by Emerson Process Management, stores and executes a controller application that implements a control strategy using a number of different, independently executed control modules or blocks. The control modules may each be made up of what are commonly referred to as function blocks. Each function block is a part or a subroutine of an overall control routine and operates in conjunction with other function blocks (via communications called links) to implement process control loops within the process plant 10.

As is well known, function blocks, which may be objects in an object-oriented programming protocol, typically perform one of an input function, such as that associated with a transmitter, a sensor or other process parameter measurement device, a control function, such as that associated with a control routine that performs PID (proportional, integral and derivative) control routines, fuzzy logic, etc. control, or an output function, which controls the operation of some device, such as a valve, to perform some physical function within the process plant 10. Of course, hybrid and other types of complex function blocks exist such as model predictive controllers (MPCs), optimizers, etc. While the Fieldbus protocol and the DeltaV system protocol use control modules and function blocks designed and implemented in an object-oriented programming protocol, the control modules could be designed using any desired control programming scheme including, for example, sequential function blocks, ladder logic, etc., and are not limited to being designed using function blocks or any other particular programming technique.

In the process plant 10 illustrated in FIG. 1, the field devices connected to the process controllers 12 may be conventional (i.e., non-smart) field devices 14 such as, for example, standard 4-20 mA devices that communicate over analog or combined analog and digital lines to the I/O device 18. Alternatively or in addition, the field devices may be smart field devices 16 having a processor and a memory such as, for example, FOUNDATION® Fieldbus field devices that communicate over a digital bus to the I/O device 19 using Fieldbus protocol communications. Smart field devices 16 may store and execute modules, or sub-modules such as function blocks associated with the control strategy implemented in the controllers 12. Function blocks, which may be disposed in two different ones of the Fieldbus field devices 16, may be executed in conjunction with the execution of the control modules within the process controllers 12 to implement process control, as is well known. Of course, the field devices 14 and 16 may be any types of devices, such as sensors, valves, transmitters, positioners, etc. and the I/O devices 18 and 19 may be any types of I/O devices conforming to any desired communication or controller protocol such as HART, Fieldbus, Profibus, etc.

In the process plant 10 of FIG. 1, the workstation 20 (which may be, for example, a personal computer) may be used by one or more operators to design the process control modules to be executed by the process controllers 12, and display routines to be executed by the workstation 20 (or other computers), and to communicate with the process controllers 12 so as to download such process control modules to the process controllers 12. Furthermore, the workstation 20 may execute display routines that receive and display information pertaining to the process plant 10 or elements thereof during operation of the process plant 10.

The workstation 20 may include a memory 34 for storing a plurality of applications and data 32. Examples of applications 32 may include configuration design applications, user interface applications, third-party applications, custom applications and the like. Examples of data 32 may include configuration data pertaining to the configuration of the process plant 10, references and resources, operating data, and other types of data. The applications and data 32 may be accessed by any authorized user (referred to herein as an operator) to view and provide functionality with respect to devices connected within the process plant 10.

While the entire plurality of applications and data 32 is illustrated as being stored in only one workstation 20, some of these applications and data 32 or other entities may be stored in and executed in other workstations or computer devices within or associated with the plant 10 such as, for example, workstation 22. Still further, the plurality of data source applications 32 may be located in different geographical locations from each other and/or the process plant 10, and adapted to communicate via any suitable communication network such as, for example, the Internet, or other private or open network.

In some embodiments the workstation 20 may be accessed via a remote computing device (not illustrated). In these embodiments, process plant 10 may include a wired or wireless network connection to the remote computing device. The network connection may be private or public, and may be of any known networking technology.

The workstation 20 may also include a processor 36 that executes the plurality of applications 32 to enable an operator to design process control modules and other routines, and to download these process control modules to the process controllers 12 (or to other computers), or to collect and display information via display screen 37 from other data source applications 32 to the operator during operation of the process plant 10.

The present disclosure generally relates to providing knowledge reference access via dynamic hyperlinks or dynamic URLs (Uniform Resource Locators) in a process control system. As used herein, the terms "hyperlink" and "URL" are used interchangeably, and generally mean a pointer or a link to a different program, document, file, or knowledge reference in a different programming environment that is, in some manner, related to a control element within the process control system. The URL may point to environments that exist within the same device or network as the control environment or that are communicatively coupled to a device or network in which the process control programming environment exists. The URL may be represented by a text field of a different color than the other information within a control programming display field, may also or instead be underlined (for example, to enable it to be viewed by persons who are color blind), may be in a different font style and/or type size or may have any other distinguishing characteristic(s) or attribute(s) to make it readily apparent to the user that the URL exists. In some embodiments, the URL may contain a generalized field so that a most current version and/or location of a knowledge reference may be accessed.

The terms "dynamic hyperlink" and "dynamic URL" are used interchangeably herein to generally mean a hyperlink or URL that is dynamically established in a process control system. Similar to a static hyperlink or a static URL, a dynamic hyperlink or dynamic URL may define an association between a process control element (or its corresponding process control object) with another process control object, such as a knowledge reference (or its corresponding knowledge object). However, for the dynamic hyperlink or dynamic URL, the link is not required to be established at configuration, and the link is not required to remain static until re-configured. Instead, the dynamic hyperlink may be dynamically established, e.g., the dynamic hyperlink may be established at any run-time of any display view that includes the process control element or corresponding process control object. Specifically, after a display view that includes a representation of the process control element is built, the dynamic hyperlink to the knowledge reference (or to a knowledge object corresponding to the knowledge reference) may then be established. Thus, with a single definition of the dynamic hyperlink, any display view in the process control system that includes the process control element may automatically include the defined, dynamic hyperlink. In some embodiments, the dynamic hyperlink may be included in computerized or digital documentation corresponding to the process control object that is accessible via the display view.

Table 205 of FIG. 2 illustrates an exemplary list of process control objects defined or configured in the process control system with which knowledge reference(s) or other process control objects may be associated via a dynamic hyperlink. For example, as shown in the table 205, a process control object may correspond to an area, a display object, a module, a node, an event, or other entity that may be referred to by the process control system. Of course, the list shown in the table 205 is illustrative only, and other process control objects with which knowledge reference(s) may be associated may also be possible. For example, in some embodiments, a process control object may correspond to a user or a group of users to which a particular knowledge reference that includes sign-on or off procedures may be linked. In another example, the process control object may itself be a knowledge object.

Table 215 of FIG. 2 illustrates an exemplary list of knowledge references that may be linked to various process control objects in the process control system via a dynamic hyperlink. A "knowledge reference," as used herein, may be a source of information available to operators, maintenance personnel or and other users of the process control system. A knowledge reference may be, for example, a device reference material, a customer material, a logbook entry, a help topic, a process control object, or other knowledge reference. Generally, a knowledge reference may be stored electronically and may be accessible by the process control system. The knowledge reference may be stored within a firewall of the process control system (e.g., an electronic logbook entry) or may be stored external to the firewall (e.g., a specification sheet of a device stored on a website of the device manufacturer). Of course, the knowledge references in the table 205 are an illustrative set only, and other knowledge references may be possible.

The term "knowledge access," as used herein, may refer to accessing a knowledge reference and/or at least some portion of its contents. The terms "knowledge reference object" and "knowledge object," as interchangeably used herein, may refer to a process control object defined in the process control system that corresponds to a knowledge reference. Note that process control objects may serve as knowledge references, as shown in the table 205 by the reference 208. In fact, in some cases, a certain process control object may simultaneously link to a knowledge reference as well as serve as a knowledge reference to which another process control object links. For instance, a process control object for a graph G on display view D may link to a loop sheet knowledge reference object that includes information regarding a loop that provides a portion of the data included in the graph G. Simultaneously, the process control object for the graph G may itself serve as a knowledge reference for different process control object, for example, for a plant area trending chart.

Once initially defined, a dynamic hyperlink may automatically be available on any instance of any display view on any workstation or computing device in communication with the process control system that exhibits a representation of the process control object. In contrast to a static hyperlink, no separate definition of additional links is required for each separate instance of the same display view or for other display views that include the process control object.

Further, if the process control object is a class object, a sub-class dynamic hyperlink may automatically be defined for each sub-class object of the class object when the class object dynamic hyperlink is defined. Each sub-class dynamic hyperlink may associate each sub-class object with the knowledge reference, and, similar to the class object dynamic hyperlink, the sub-class dynamic hyperlink may be established each time a display view including the sub-class object is built.

The dynamic hyperlinks of the present disclosure provide significant benefits and advantages over static hyperlinks in a process control system. One such advantage provided by dynamic hyperlinks is flexibility. As dynamic hyperlinks are realized at run-time and not at configuration, any display view on any workstation or computing device that builds a representation of the specific process control object may automatically incorporate the dynamic hyperlink into the display view at run-time, and a different hyperlink is not required to be configured for each instance of each display view across various computing devices. Modifications to dynamic hyperlinks are also easily accommodated without need for a configuration or download. In this manner, dynamic hyperlinks/URLs require significantly less time and memory for administration than required by static hyperlinks/URLs.

For example, consider a process control object corresponding to a model of a pressure sensor that has dynamic hyperlinks to multiple knowledge references (e.g., specification sheet, installation procedures, operating and service manuals, etc.). Each of the multiple dynamic hyperlinks to the multiple knowledge references may be initially defined in the process control system. After the initial definitions of the multiple dynamic hyperlinks associated with the pressure sensor object, an operator viewing a first display view at a first console may monitor a control loop including a specific instance of the pressure sensor model. If any alarms or abnormalities occur, the operator may simply select the specific instance on the first display view and may gain access to a specification sheet to obtain needed information regarding the pressure sensor.

A plant engineer using a second console at another location (for instance, using a remote terminal that accesses the process control system via an Internet connection) may be designing a new control process. The plant engineer may bring up a second display view including a set of available pressure sensor models to help him or her decide between several options. He or she may click on an image of the pressure sensor model on the second display view to, for instance, view the specification sheet of the pressure sensor model. Unbeknownst to the plant engineer, the same dynamic hyperlink definition used by the first display view was used during the build of the second display view and established the dynamic hyperlink on the second display view providing access to the specification sheet.

An installer using a third console at yet another location in the process control plant may be installing devices and equipment including a new instance of the pressure sensor model. The installer and may access a third display view and may select the pressure sensor model to gain access to the specification sheet for the pressure sensor model. Similar to the second display view, the dynamic hyperlink to access the specification sheet was established during a run-time of the third display view from the initial definition of the dynamic hyperlink.

In the above examples, although the dynamic hyperlink associating the pressure sensor with the specification sheet was defined only once, each of the first, second and third display views independently established the associated dynamic hyperlinks as a part of a run-time build process of the respective display view. Separate definitions or configurations were not required for each display view. In this manner, dynamic hyperlinks may be efficiently and conveniently established during run-times of display views whenever and wherever needed throughout the process control plant.

Other advantages provided by dynamic hyperlinks may include speed and accuracy. As dynamic hyperlinks may be updated in real-time, any subsequent view opened after an update is ensured to contain the most recent information for the dynamic hyperlink. Also, operators may easily and quickly access knowledge references without having to find where the desired references are stored, retrieve the references, and use the appropriate program to open them. This speed and accuracy advantage is especially important in emergency scenarios. For example, during an abnormal alarm situation, a dynamic hyperlink may quickly and accurately provide an operator access to critical alarm data, instructions, and procedures.

Furthermore, the dynamic hyperlinks of the present disclosure may also provide an additional benefit of automatically perpetuating hyperlink definitions throughout classes of process control objects. A definition of a dynamic hyperlink between a process control class object and a knowledge object or reference may automatically result in a definition of a dynamic hyperlink between each sub-class object of the process control class object and the knowledge object or reference. Additional steps, time and memory to provide and administer a separate static hyperlink for each sub-class object of the process control class object are eliminated with the dynamic hyperlinks of the present disclosure.

Additionally, with dynamic hyperlinks, administrative costs and time are reduced. A reconfiguration or manual download is not required each time a dynamic hyperlink is created or modified. An addition of a new process control object does not require separate hyperlinks for linking to a same knowledge reference to be defined across various display views. Instead, after a single, initial definition of a dynamic hyperlink, the process control system may simply and efficiently establish the dynamic hyperlink in real-time as needed at any display view. Subsequently-opened display views may automatically re-establish the dynamic hyperlink when the subsequent display views are built.

Figure 3A:
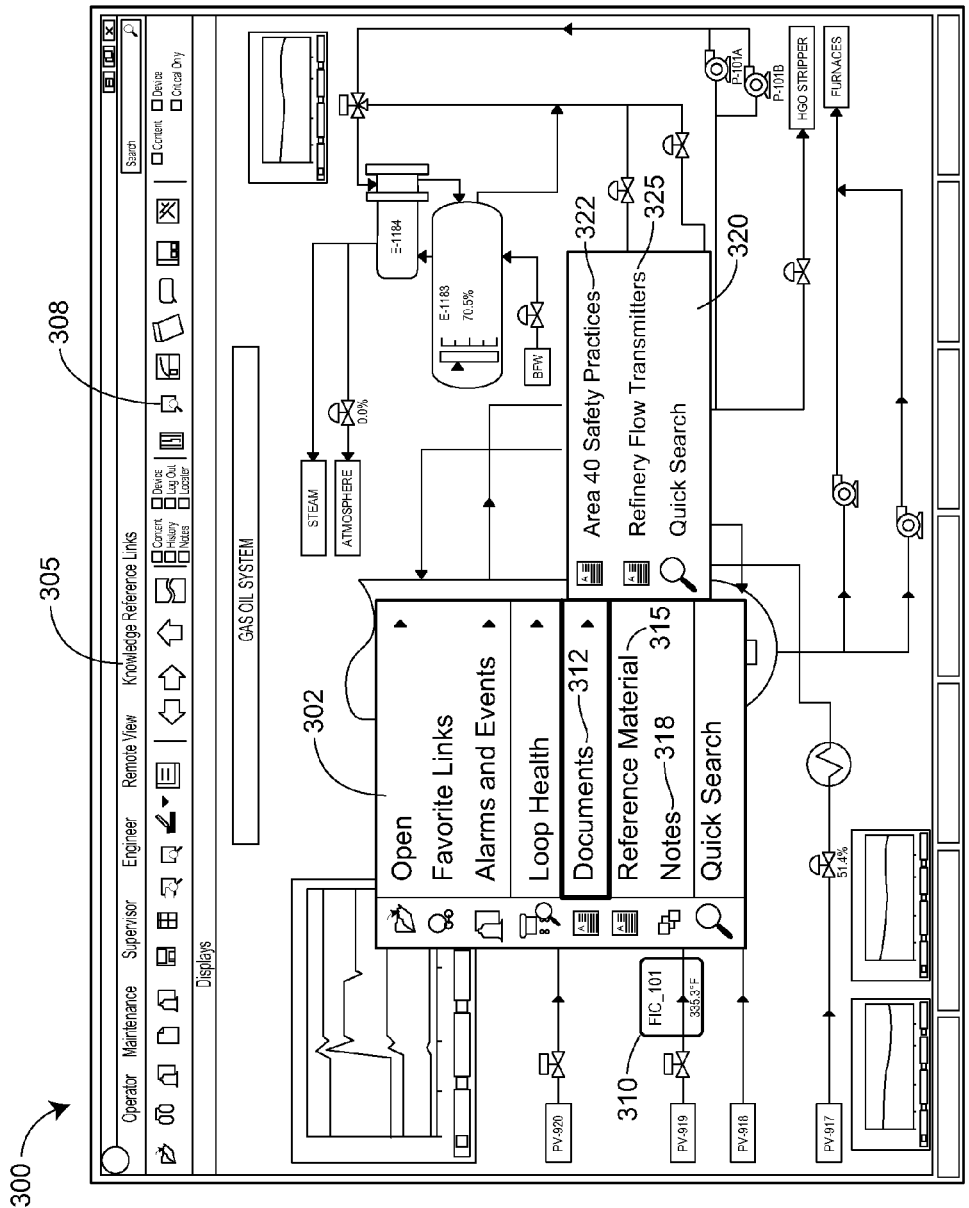
FIG. 3A is an embodiment of a display view depicting knowledge access using a dynamic hyperlink corresponding to a process control object in a process control system.

Turning now to FIG. 3A, FIG. 3A is an embodiment of a display view 300 illustrating access of a knowledge reference via a dynamic hyperlink in a process control system of a process control plant, such as the process plant 10 of FIG. 1. The display view 300 may have thereon any number of representations of process control objects in the process control plant, such as process control objects corresponding to loops, devices, function blocks, etc. Indeed, the display view 300 itself may have a corresponding process control object.

An operator or user may easily access knowledge references linked to a process control object on the display view simply by selecting the process control object. With, for example, a right-click on the selected process control object, a window 302 may appear that includes, among other menu options, corresponding knowledge references associated with the selected process control object. In another embodiment, the user may select the process control object and indicate a desire to access the corresponding knowledge references associated with the process control object via a drop-down menu 305 or via a display control on a tool bar 308. In the example illustrated by the display screen 300 in FIG. 3A, the user has selected a representation of a flow transmitter 310 on the display screen 300 and has right-clicked on the flow transmitter 310 (as represented by a highlight of the flow transmitter 310), thus causing the window 302 of menu options to appear.

The window 302 may display a list of menu options available with regard to the selected process control object, including categories of or administrative operations for the corresponding knowledge references. In FIG. 3A, the illustrated categories of corresponding knowledge references include a documents category 312, a reference materials category 315, and a notes category 318. The documents category 312 may include, for example, customer documentation materials such as Standard Operating Procedures (SOPs), incident reports, safety manuals, best practices, or other documents provided to a customer. The documents category 312 may also include drawings such as loop sheets, P&IDs (Process and Instrumentation Diagrams), pictures, training videos, and the like. The reference materials category 315 may include, for example, reference materials for devices, reference materials for equipment, and/or help topics, some of which may be provided by third parties. Examples of reference materials 315 may include product data sheets, specification sheets, operating manuals, service manuals, and the like. The notes category 318 may include, for example, operator logbook entries, work orders, incidents, etc.

Of course, the categories 312, 315 and 318 illustrated in the window 302 of FIG. 3A are exemplary only. With embodiments of the present disclosure, any number, types or categories of knowledge references may appear in the window 302, either as a list and/or as list of categorical groupings of the knowledge references. The categorical groupings may be fixed, or they may be defined or modified as desired.

In the example of FIG. 3A, the user has selected the menu option of the documents category 312. A resulting child window 320 may open and may list knowledge references specific to the documents category 312 that were defined to be associated with the process control object 310. In this example, two knowledge references (322, 325) corresponding to the documents category 312 are shown as accessible: a safety practices knowledge reference 322 and a knowledge reference regarding refinery flow transmitters 325. The user may select the desired knowledge reference (e.g., by clicking on 322 or 325) and, via a dynamic hyperlink (not illustrated), the selected knowledge reference may be located and displayed on the display view 300 or in a separate window (not shown).

The apparent ease with which the user may access his or her desired knowledge reference in FIG. 3A may be enabled by the dynamic hyperlink or dynamic URL of the present disclosure. The dynamic hyperlink may dynamically link a process control object corresponding to a process control element with a knowledge object in the process control system corresponding to a knowledge reference. In fact, a separate dynamic hyperlink may link the process control object with each corresponding knowledge object. Thus, in the example of FIG. 3A, a first dynamic hyperlink may link the process control object 310 and the area safety procedure document 322, a second dynamic hyperlink may link the process control object 310 and the refinery flow transmitters document 325, and still other separate dynamic hyperlinks may each link the process control object 310 with other knowledge references accessible via menu options 312, 315 and 318. Each separate dynamic hyperlink may be stored in a dynamic hyperlink database, such as the embodiment 400 of the dynamic hyperlink database depicted in FIG. 4.

Turning briefly to the embodiment of the dynamic hyperlink database 400 illustrated in FIG. 4, each entry of the database 400 may correspond to a defined dynamic hyperlink in the process control system. Each entry may contain, for example, an entry identifier 402, an indication of a process control object 405, and an indication of a knowledge reference object 408. The indication of the process control object 405 may be, for example, a name, a location, an alias, a pointer, or some other indicator. Similarly, the indication of the knowledge reference object 408 may be, for example, a name, a location, an alias, a pointer, or some other indicator. Each entry may also contain attributes such as an expiration time or an expiration time interval for the entry 410, and an access privilege indication 412. Of course, the attributes 402-412 are exemplary only. Embodiments of the dynamic hyperlink database 400 may have entries with only a subset of the attributes 402-412, and/or one or more additional attributes 413. One or more other attributes 413 may indicate, for example, an author of the dynamic hyperlink, a category of the dynamic hyperlink, a property of the dynamic hyperlink, a corresponding display view or views on which the dynamic hyperlink may appear, or a time stamp reflecting the entry's creation date and time.

A dynamic hyperlink may be defined and a corresponding entry may be created in the database 400 in conjunction with a configuration of a process control object or a knowledge reference object that is to be included in its definition. A dynamic hyperlink may be defined during run-time. (An example of run-time definition will be described in a subsequent section.) A dynamic hyperlink may be manually defined by a user, or may be automatically defined by the process control system.

The dynamic hyperlink database 400 may be stored in the process control system independently (either logically, physically or both) of a configuration database or other database that stores process control objects. The dynamic hyperlink database 400 may be stored independently of a database that stores knowledge objects. The dynamic hyperlink database 400 may be centralized within the process control system, e.g., centrally accessible by some or all computing devices or users in communication with the process control system. The dynamic hyperlink database 400 may be indexed and/or searchable. In some embodiments, the dynamic hyperlink database 400 may be searchable via a filter for one of more of the fields 402-413. For example, a filter may be applied to the dynamic hyperlink database 400 to find all entries that are related to alarms in a certain area of the process plant.

When a new dynamic hyperlink is defined, a new entry may be added to the dynamic hyperlink database 400 that includes an indication of a particular process control object and a particular knowledge object corresponding to a particular knowledge reference. If the particular process control object is a class object, additional new entries may also be automatically added to the dynamic hyperlink database 400, with each additional new entry including an indication of a sub-class object of the class object and the indication of the particular knowledge object. For example, in FIG. 4, a new entry #0001 (reference 415) for a new dynamic hyperlink may be added to define a link between a process control class object corresponding to an ACME valve model #402B (reference 418) with a corresponding product data sheet (reference 420). As a result of the new entry #0001 (reference 415) being created, a new entry #0002 (reference 422) and a new entry #0003 (reference 425) may automatically be created, with each entry (422, 425) associating a specific, serial number-identified ACME valve of model #402B in the process control plant with the corresponding product data sheet.

In this fashion, dynamic hyperlinks may be automatically defined for sub-classes of class objects in the process control system. In some embodiments, the process for automatic definition of dynamic hyperlinks for sub-class objects may be modified as desired. For example, auto-definition may be able to be turned on and off for some or all areas of the process control system, for some users or user groups or for some process control objects. A default mode of auto-definition may be defined for some process control objects or sub-class objects.

Although dynamic hyperlinks are initially defined as entries in the database 400, the dynamic hyperlinks may not be established until after a display view is accessed and built. After a particular display view is built or opened at a computing device in communication with the process control system, the dynamic hyperlink database 400 may be searched to determine if any process control objects thereon have associated defined dynamic hyperlinks, and then the identified associated defined dynamic hyperlinks may be established. The display view may include an indication that "live" or defined dynamic hyperlinks corresponding to the display view or process control objects thereon are available. The indication may be, for example, a graphical icon such as a paperclip or a book, and/or the indication may be alphanumeric. The indication may be a single, general indication, or there may be a separate indication of available dynamic hyperlinks for each process control object or group of process control objects. Upon receiving a selection of a particular "live" dynamic hyperlink, a corresponding knowledge reference may be accessed and displayed, such as previously discussed with regard to FIG. 3A.

Indeed, the dynamic hyperlink database 400 may enable any display view to establish all defined hyperlinks associated with process control objects thereon at its run-time. Any display view in the process control system may thus easily link process control objects thereon with associated knowledge objects without having to perform a configuration change or a download.

Entries of the dynamic hyperlink database 400 may be updated. For example, if a name or location of a particular process control object changes, its corresponding entry in the dynamic hyperlink database 400 may be updated to reflect the changes. Similarly, if a name or location of a particular knowledge object changes, its corresponding entry in the dynamic hyperlink database 400 may be updated to reflect the changes. Changes to attributes 410-413, whether based on a user-initiated action or on a system-initiated action, may also result in corresponding entries being updated.

The dynamic hyperlink database 400 may be audited at intervals to ensure validity of its entries. For example, each entry may be assessed to determine a validity of a name, location and existence of an indicated process control object and an indicated knowledge reference object. An entry having invalid attributes may be updated with new information or otherwise resolved. If an entry having invalid attributes cannot be resolved, the entry may be automatically deleted from the dynamic hyperlink database 400. Auto-deletion, however, may be overridden for an entry or group of entries by a system administrator or other user having a necessary authority level.

In fact, permission to perform some or all dynamic hyperlink administrative operations for a dynamic hyperlink or a group of dynamic hyperlinks may be assigned based on an authority level of a user or group of users. The dynamic hyperlink administrative operations may include, for example, create, delete, override auto-delete, modify, view, link, search, and other such administrative operations. The authority or permission level(s) may be reflected, for instance, in the field 412 for each dynamic hyperlink's entry in the dynamic hyperlink database 400. In some embodiments, different levels of permission may be set for different dynamic hyperlink administrative functions, for different process control objects or groups of process control objects, for different locations in the process control plant, and/or for different knowledge references or categories of knowledge references. For example, permissions may be set so that a dynamic hyperlink that associates a particular device with an incident report may be viewable but not modifiable. In another example, instructions for an emergency procedure linked by a dynamic hyperlink to a specific control loop may be shown on as a menu option in a display view accessed by a control operator, but may not be visible in a display view accessed by a maintenance technician.

Turning to FIG. 3B, FIG. 3B again illustrates the display view 300, but instead of a user having selected a process control object corresponding to a device represented on the display view 300 (such as the highlighted reference 310 of FIG. 3A), the user has selected the display view 300 itself to obtain access corresponding knowledge references. The user may have indicated a desire to access corresponding knowledge references for the display view 300, for example, via a command on a drop-down menu (not shown), from a selectable icon or button 330, by right-clicking anywhere on the display view 300 itself, or by some other means of selection.

Figure 3B:
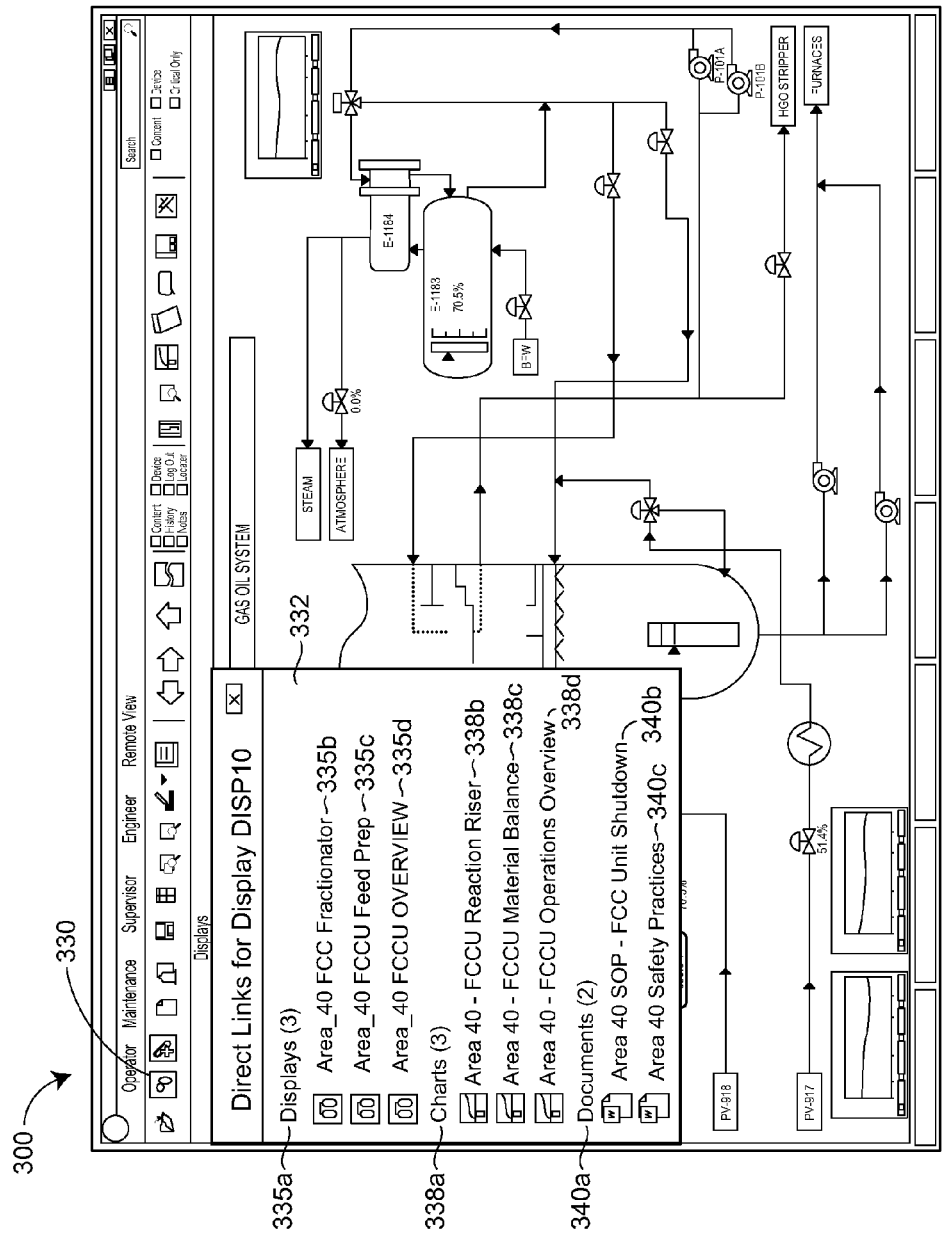
FIG. 3B is an embodiment of the display view depicting knowledge access for a different process control object using a different dynamic hyperlink on the display view.

Upon selection of the display view 300, a window 332 including a list of accessible knowledge references corresponding to a process control object corresponding to the selected display view 300 may appear. In some embodiments, the list of corresponding knowledge references may be categorized. In FIG. 3B, the corresponding knowledge references are illustrated in categories "Displays" (335a), "Charts" (338a) and "Documents" (330a), however, the three illustrated categories 335a, 338a and 340a and examples of specific knowledge references therein (references 335b-335d, 338b-338d and 340b-340c) are exemplary only. With embodiments of the present disclosure, any number or type of knowledge references may appear in the window 332 as a list or as list of categories having any desired set of categorical definitions. In some embodiments, contents of the window 332 may be searchable for user convenience, such as by using a search operation or a filter.

The user may select a desired knowledge reference (e.g., by clicking on one of references 335b-335d, 338b-338d, 340b-340c) and the selected knowledge reference may be accessed via a corresponding dynamic hyperlink and may be displayed on the display view 300 or in a separate window (not shown).

Figure 3C:
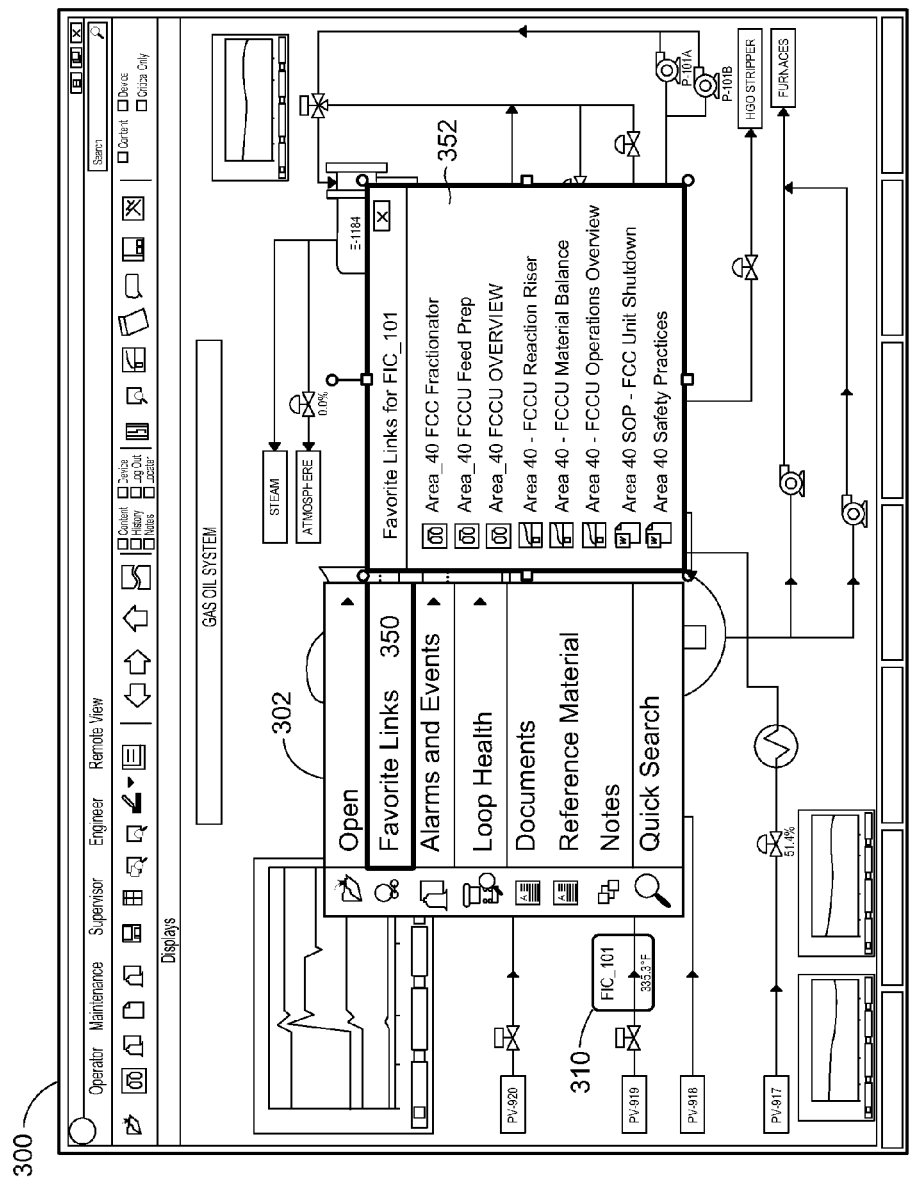
FIG. 3C illustrates another example of providing of dynamic hyperlinks in a process control system.

FIG. 3C illustrates another example of providing dynamic hyperlinks in a process control system. FIG. 3C again illustrates the display view 300 of FIGS. 3A and 3B. In FIG. 3C, similar to FIG. 3A, the user has selected the process control object 310 and has right-clicked to result in an appearance of the window 302. In the example illustrated by FIG. 3C, however, the user has selected the menu option "Favorite Links" (reference 350). In response to the selection of "Favorite Links" 350, a child window 352 may appear including a list of knowledge references, each of which has been previously designated as a "Favorite Link," that are associated with the process control object 310. Of course, each list entry in the window 352 may have a corresponding dynamic hyperlink established to link the process object 310 to the corresponding "Favorite" knowledge reference object.

Figure 5:
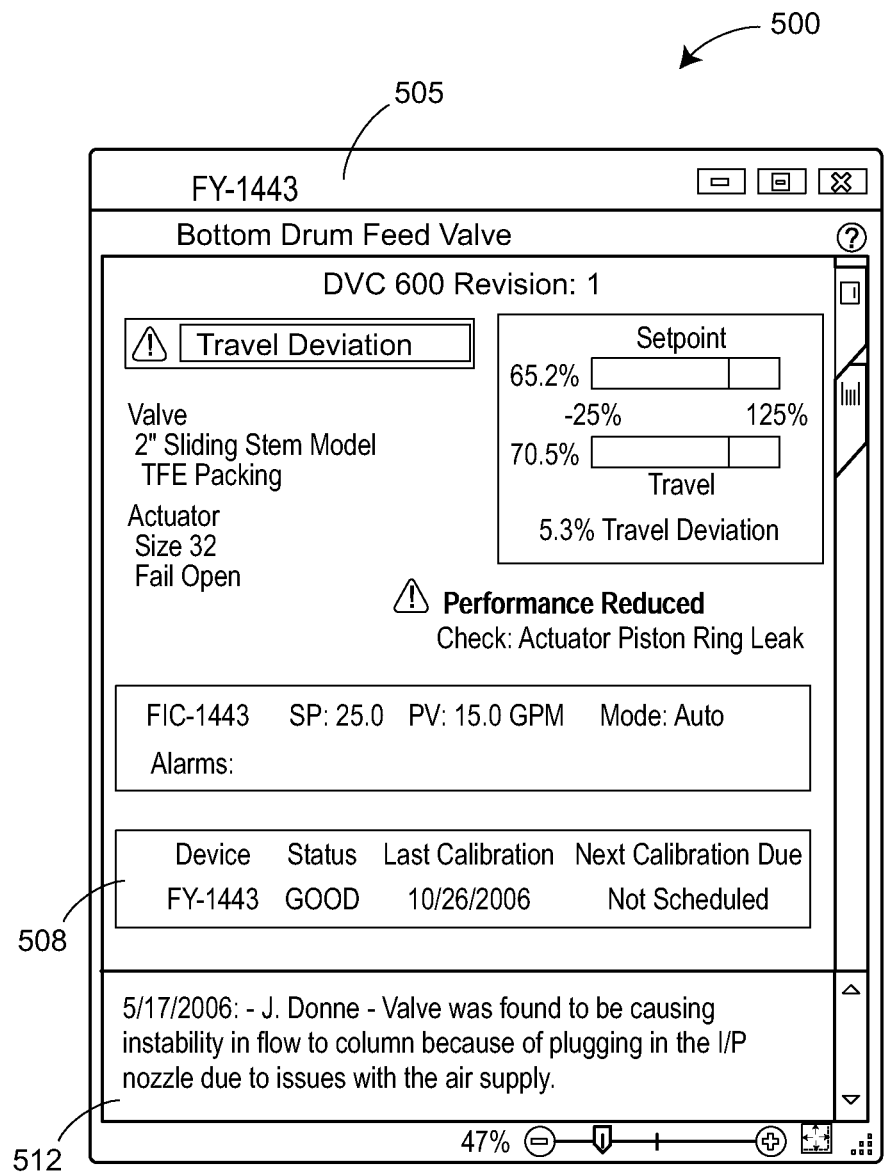
FIG. 5 illustrates an example of modifying a knowledge reference via a dynamic hyperlink.

In some embodiments of accessing knowledge references via dynamic hyperlinks in a process control system, a knowledge reference may be modified via a dynamic hyperlink. FIG. 5 illustrates a window 500 that exhibits thereon a faceplate display 505 for a bottom drum feed valve FY-1443. The faceplate display 505 may present information pertaining to the bottom drum feed valve FY-1443 such as configuration, real-time data, etc. The faceplate display 505 may be exhibited on the window 500, for example, as a result of following knowledge access procedures discussed for FIG. 3A, e.g., by selecting the bottom drum feed valve FY-1443 on a particular display view and selecting the faceplate display 505 from a list of available knowledge references associated with the bottom drum feed valve FY-1443. In particular, a dynamic hyperlink may associate a process control object of the particular display view with a process control object of the faceplate display 505, and a selection of the dynamic hyperlink may have resulted in the presentation of the faceplate display 505 on the window 500.

In addition to being an object of a dynamic hyperlink, the faceplate display 505 itself may also link to other process control objects or knowledge objects via other dynamic hyperlinks. FIG. 5 illustrates the faceplate display 505 as dynamically linked to two accessed knowledge references, a calibration record 508 from a maintenance file and operator notes 512. (Of course, although only two accessed knowledge references are illustrated in FIG. 5, any number of knowledge references or process control objects may be accessed through a process control object via dynamic hyperlinks.) To access and display the contents of the calibration record 508 as shown in FIG. 5, a first dynamic hyperlink associating the process control object of the faceplate display 505 with a knowledge object of the calibration record 508 may have been selected. Likewise, to access and display the contents of the operator notes 512 as shown in FIG. 5, a second dynamic hyperlink associating the process control object of the faceplate display 505 with a knowledge object of the operator notes 512 may have been selected.

A user may conveniently modify a knowledge reference such as the operator notes knowledge reference 512 via the dynamic hyperlink. For example, in the window 500, the user has added text into the opened operator notes 512. This integrated editing capability may increase user efficiency. The user is no longer required to stop his or her workflow, search for and locate the correct corresponding operator notes entry for the bottom drum feed valve FY-1443, and open the entry with a corresponding editing program on a corresponding computing device. With the dynamic hyperlinks of the present disclosure, the user may remain at his or her workstation, and in the context of his or her present workflow, simply select and open the desired operator notes knowledge reference 512 and conveniently add any desired additional information. In at least this manner, the established dynamic hyperlink may provide direct editorial access to the operator notes knowledge reference 512. Of course, editing the operator notes knowledge reference 512 is just one example of editing accessible knowledge references via dynamic hyperlinks. Other knowledge references other than operator notes 512 may also be edited via dynamic hyperlinks.

Moreover, with dynamic hyperlinks, any changes to a characteristic of the operator notes knowledge reference 512 (or, indeed, to any accessible knowledge reference) may not impact user access. Such changes may include (but are not limited to) a re-naming of a file corresponding to the knowledge reference, a re-location of some or all of the file to a different server, or other changes. In fact, the user may even be ignorant of the changes to knowledge references or their characteristics. The user may simply follow his or her normal procedures of accessing a display view, selecting the representation of the bottom drum feed valve FY-1443, and selecting the operator notes knowledge reference 512. The dynamic hyperlink may automatically (and transparently to the user) provide the link to the changed operator notes knowledge reference 512. In contrast, with static hyperlinks, the user would be forced to be aware of the changes to the operator notes knowledge reference 512 and would be required to reconfigure the display to properly access the changed reference 512.

Figure 6:
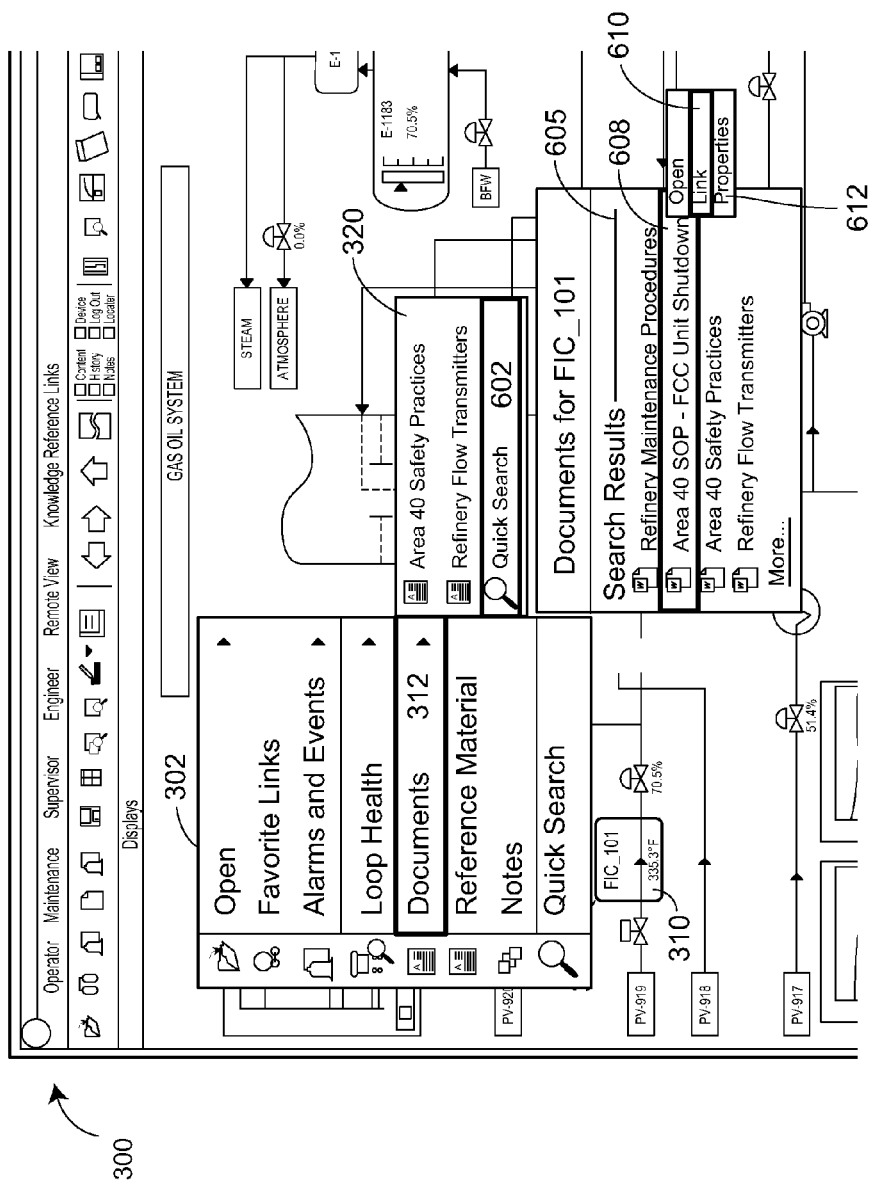
FIG. 6 is an embodiment of administrating a dynamic hyperlink via a process control system display view.

The present disclosure provides for including dynamic hyperlink administrative operations into process control system displays. FIG. 6 illustrates an embodiment of a scenario of a user creating a dynamic hyperlink. In this embodiment, the user may search through a list of available knowledge references, select a desired knowledge reference, and link the desired knowledge reference to a desired process control object. FIG. 6 includes the display view 300 of FIGS. 3A and 3B, and, similar to FIG. 3A, the user has selected the process control object 310, has right-clicked to view the window 302, and has selected the menu option "Documents" 312 to view the window 320. Note that in the scenario of FIG. 6, the display view 300 is opened (e.g., run-time, not configuration).

In the example illustrated by FIG. 6, the desired knowledge reference is not listed in the window 320, so the user has selected the menu option "Quick Search" 602 from the window 320. A search mechanism, such as "Quick Search" 602, may search, corresponding to user input, available knowledge references that are accessible to the process control system. The search mechanism 602 may use one or more filters, character recognition, indexing or any known method of searching to find potential matching knowledge references. A list of search results may appear in a search results window 605, and the user may select the desired knowledge reference. In FIG. 6, the user has selected an "Area 40 SOP-FCC Unit Shutdown" document (reference 608), as denoted by the highlighted entry 608.

The user may link the selected document 608 to the process control object 310 by, for example, right-clicking on the selected document 608 and selecting a "Link" command 610 displayed in the resulting window 612. The selection of the "Link" command 610 may result in a dynamic hyperlink being defined (and, in some embodiments, entered as a new entry into the dynamic hyperlink database 400 of FIG. 4) and being established between the process control object 310 and a knowledge reference object corresponding to the selected document 608. Accordingly, future accesses of display views that include the process control object 310 may include the newly created dynamic hyperlink between the process control object 310 and the knowledge object of the selected document 608.

In other embodiments, instead of right-clicking on the selected document 608 to access a link command, the user may link the selected document 608 and the process control object 310 via other means, such as a selection from a drop-down menu (not shown), a selection of a control on the display screen 300, or via a drag-and-drop operation. For instance, the user may drag the selected document icon 608 and drop it into the "Documents" 312 icon of the window 302 and thus may create the dynamic hyperlink.

Of course, while FIG. 6 illustrates a scenario of creating a dynamic hyperlink, other administrative operations may be possible. For example, in at least a similar fashion, the user may be able to delete, modify, set permissions for, set expiration times for, and/or view a dynamic hyperlink. An ability to perform one or more dynamic hyperlink administrative operations may be based upon an authority level of the user or upon an authority level of a group to which the user belongs. A specific dynamic hyperlink or a specific group of dynamic hyperlinks may be defined to be accessible based on a specific authority level. Typically, the authority level of the user may be determined via a login identity of the user.

Alternatively or additionally, access to one or more dynamic hyperlinks and one or more corresponding administrative operations may be based on some other criteria, such as a location or area of the process control plant or specific display views. Different levels of access may be defined for different process control objects and/or for different administrative dynamic hyperlink operations (i.e., create, modify, view, delete, view, link, search and/or equivalents thereof). Different levels of access may be defined for different workstations in the process control system.

In addition to specific, individual dynamic hyperlink administrative operations (i.e., create, modify, view, delete, view, link, search, etc.), the user may be able to set general parameters corresponding to dynamic hyperlinks, such as default times of expiration, auto-deletion, or how invalid entries in the dynamic hyperlink database are resolved. Other general dynamic hyperlink administrative operations may be possible.

The aforementioned and other administrative dynamic hyperlink functions are illustrated as being accessed via a process control object on a display view, such as in the scenarios of FIGS. 3A-3C and in the scenario of FIG. 6. In these scenarios, the user may select a desired process control object. After selecting the desired process control object, the user may then access a menu, search for, and select a desired administrative operation and/or a desired knowledge reference (e.g., by using a right-click to display a menu of options, by a drag-and-drop, by a drop-down menu selection, by a display control, etc.).

Alternatively or additionally, the user may access administrative dynamic hyperlink functions by accessing a knowledge reference object. A user may select a desired knowledge reference, for instance, from an existing display view that includes available knowledge references accessible to the process control system. After selecting the desired knowledge reference, the user may then access a menu, search for and select a desired process control object. A desired administrative dynamic hyperlink function may then be selected and performed (e.g., using a right-click to display a menu of options, by a drag-and-drop, by a display control, by a drop-down menu selection, etc.).

In yet another embodiment, a separate display view dedicated to administrative dynamic hyperlink operations may be provided in the process control system. The separate display view may contain menus or lists of all available process control objects and all available knowledge references in the process control system. The separate display view may include a set of administrative dynamic hyperlink functions (e.g., create, delete, modify, view, link, un-link, audit, set permissions, set expiration time, etc. or equivalents thereof) that may each be selected and performed. Access to some or all administrative dynamic hyperlink functions may be permission-based, for example, based on an authority level of a user or a group to which the user belongs. The separate display view may include drop-down menus, command interfaces, drag-and-drop operations, display controls, and the like.

Figure 7:
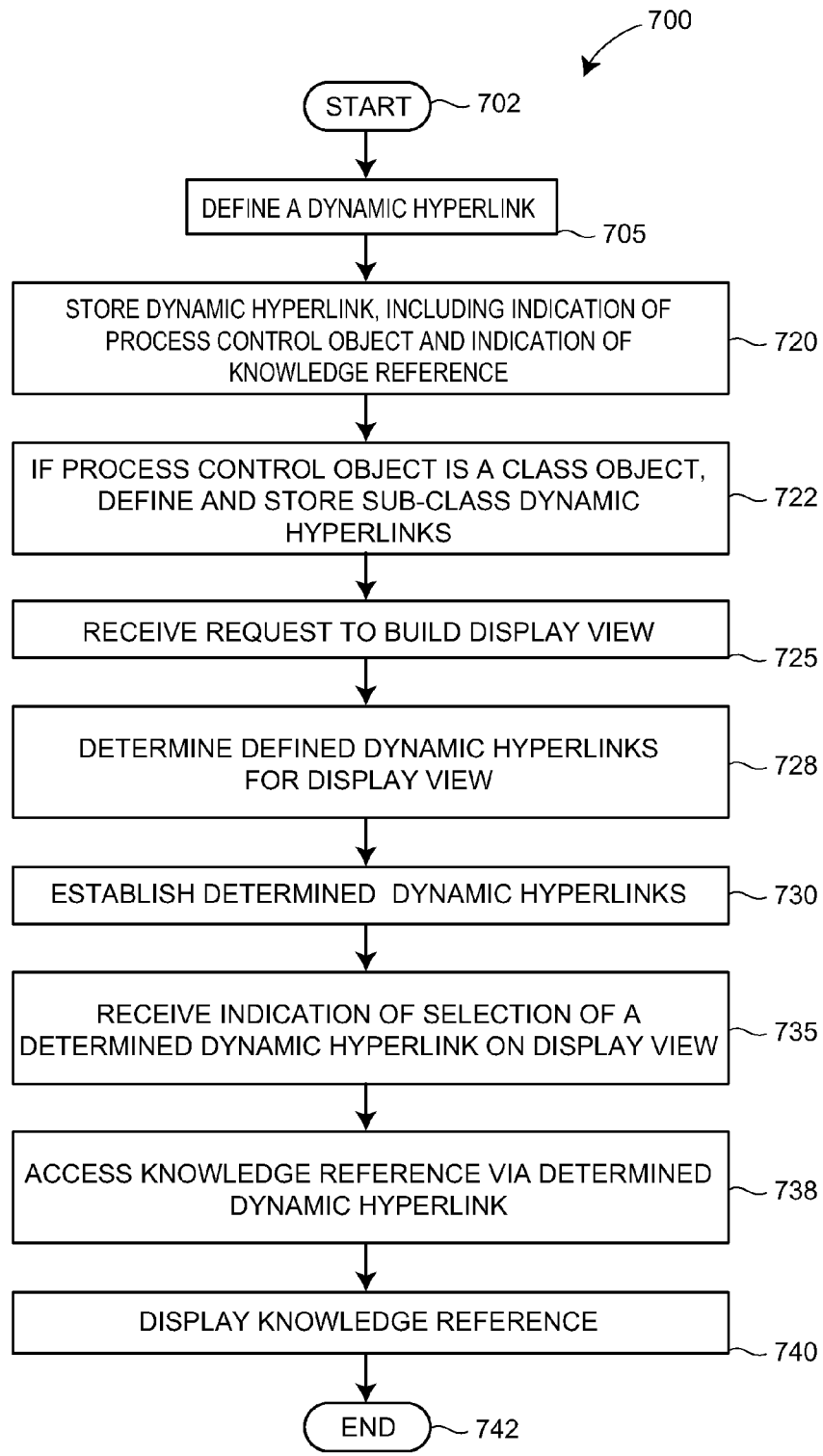
FIG. 7 depicts an exemplary method for providing a dynamic hyperlink in a process control system.

FIG. 7 shows an exemplary embodiment of a method 700 for providing a dynamic hyperlink in a process control system. Embodiments of method 700 may operate in accordance with embodiments of the process control system and plant 10 of FIG. 1, with embodiments of including dynamic hyperlinks and knowledge reference access in a process control system as illustrated in FIGS. 2-6.

At the start 702 of the method 700, a dynamic hyperlink may be defined 705. The dynamic hyperlink may be defined to specify an association between a process control object in the process control system and a knowledge object in the process control system. The process control object may be a class object that has one or more corresponding sub-class objects, or the process control object may not be a class object. The knowledge object may correspond to a knowledge reference that is accessible to the process control system, and that may be stored internal or external to a firewall of the process control system.

At the block 720 of the method 700, an entry corresponding to the defined dynamic hyperlink may be stored in a dynamic hyperlink database, such as an embodiment of the dynamic hyperlink database 400 of FIG. 4. The entry corresponding to the defined dynamic hyperlink may include an indication of the process control object and an indication of the knowledge object. If the process control object is a class object, one or more additional dynamic hyperlinks associating each sub-class object of the class object with the knowledge object may also be defined and stored into the dynamic hyperlink database (block 722). Of course, the block 722 is optional and may be omitted if the process control object is not a class object. Also, as previously discussed, the creation of additional dynamic hyperlinks corresponding to sub-class objects may be subject to user preferences.

At block 725, a request may be received to build a display view. At block 728, all process control objects included in the display view that have defined dynamic hyperlinks may be determined, for example, by searching the dynamic hyperlink database. In some embodiments, one or more visual indicators may be displayed on the display view to indicate that one or more process control objects included in the display view is associated with a defined dynamic hyperlink. In some embodiments, the one or more visual indicators may only be displayed based on permission level. For example, permissions may be based on the user's authority level, an authority level of a group to which the user belongs, a plant location, an area, a workstation or computing device, and/or some other criteria.

At block 730, the determined dynamic hyperlinks for the requested display view may be established. That is, each determined dynamic hyperlink on the requested display view may be displayed and may provide direct access to its corresponding knowledge reference. Thus, when a selection of a determined dynamic hyperlink on the display view is received (block 735), such as by a user click or other selection means, access to the corresponding knowledge reference may be provided (block 738) and contents of the corresponding knowledge reference may be displayed (block 740). For example, contents the corresponding knowledge reference may appear in a pop-up window or in at least a portion of the display view. Finally, at block 742, the method 700 may end.

If a separate request to view the display view is received at another workstation, console or computing device in communication with the process control system, a separate instance of the display view may be built in response to the separate request, and the process control objects and associated dynamic hyperlinks thereon may be refreshed. In this manner, whenever and wherever the display view is built in the process control system, the most recent definition of the dynamic hyperlink may be determined and displayed. For example, if a dynamic hyperlink definition is changed between an initial display view instance and a subsequent display view instance, any changes made between the instances will be automatically included in the subsequent display view instance.

In some embodiments of the method 700, defining the dynamic hyperlink 705 and storing the defined dynamic hyperlink 720 may be automatically performed for some portion of all dynamic hyperlinks in the process control system. For example, when a new device and a corresponding new process control object is added and configured for the process control system, available knowledge objects in the process control system may be automatically analyzed for applicability to the new process control object, and each applicable available knowledge object may be automatically incorporated into a new dynamic hyperlink associating the new process control object with the each applicable available knowledge object. In some embodiments, the automatic analysis and creation of dynamic hyperlinks may be performed by using keywords, tags, metadata and the like. In one of many possible examples, a new knowledge reference such as a new service bulletin may be tagged with a device name. Based on the tag, dynamic hyperlinks to the service bulletin may be generated for devices in the process control system having the device name.

Alternatively or additionally, in some embodiments, the blocks 705 and 720 may be performed manually, such as in the example previously described with regard to FIG. 6. For example, an operator may create a new logbook entry and manually link (i.e., create a new dynamic hyperlink between) the new logbook entry and each process control object mentioned in the new logbook entry. Permissions to manually define or create dynamic hyperlinks may be based on the operator or user's authority level.

In some embodiments, the process control object itself may be a knowledge object, and displayed contents of a corresponding knowledge reference may include an embedded dynamic hyperlink. In just one example, the embedded hyperlink may associate the knowledge reference to real-time data. Similar to previously discussed dynamic hyperlinks, the embedded dynamic hyperlink in the knowledge reference may also be established at run-time. Thus, when the contents of the knowledge reference are displayed, the embedded dynamic hyperlink may link to the real-time data to obtain refreshed values that are embedded for view within the contents of the knowledge reference.

Consider an example of a "best practices" knowledge reference. The "best practices" knowledge reference may include an embedded dynamic hyperlink to boundary condition values that are determined in real-time. When a user accesses the "best practices" knowledge reference, the "best practices" knowledge reference may automatically include therein refreshed, up-to-date real-time values of the boundary condition values obtained via the embedded dynamic hyperlink.

Figure 8:
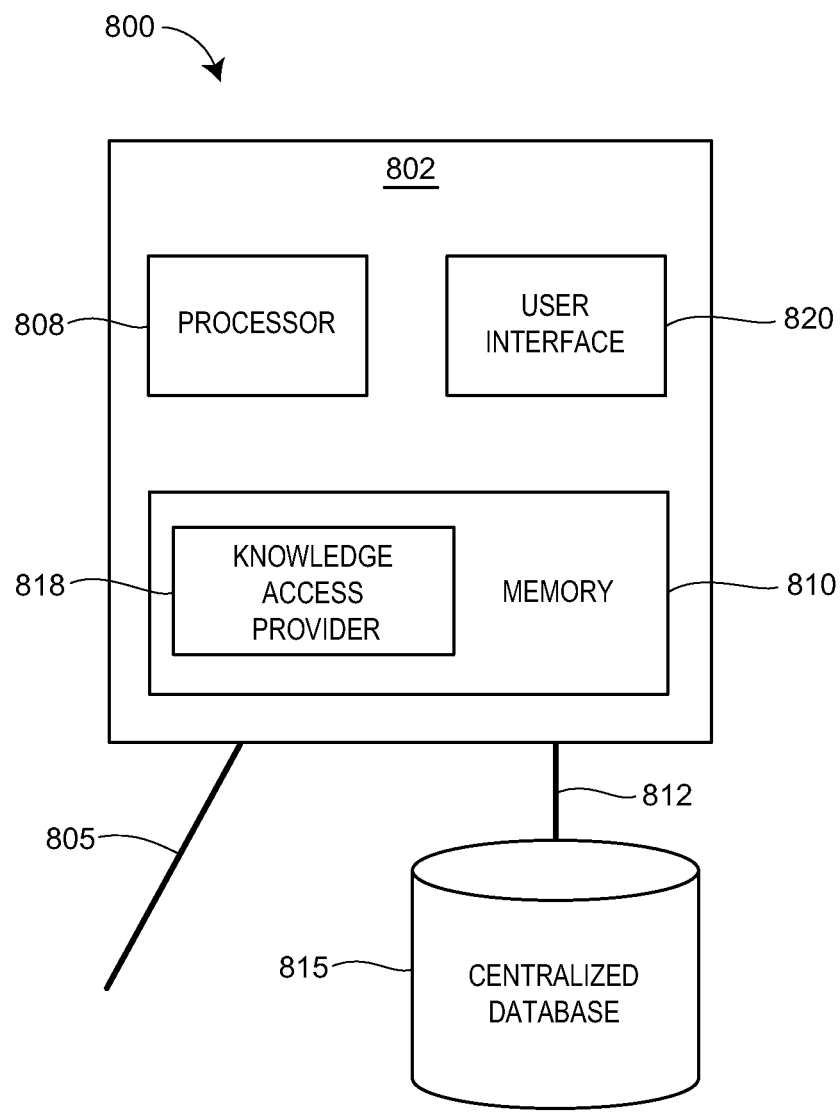
FIG. 8 depicts an embodiment of a knowledge access system for use in a process control system.

FIG. 8 is an exemplary embodiment of a knowledge access system 800 for use in a process control system. Embodiments of the system 800 may be incorporated into embodiments of the process control system and process control plant illustrated in FIG. 1, or may operate in conjunction with embodiments of the process control system and the plant 10 illustrated in FIG. 1. Embodiments of the system 800 may operate in accordance with embodiments of the disclosure illustrated in FIGS. 2-7.

The knowledge access system 800 may include a computing device 802 which may be, for example, the host or the operator workstations 20, 22 of FIG. 1. In some embodiments, the computing device 802 may not be a part of a process plant or process control system itself, but may be communicatively coupled to a computer of the process plant control system (e.g., the host or the operator workstations 20, 22 of FIG. 1) via a network link 805. The link 805 may be a direct or remote connection, and may be wired or wireless. The link 805 may provide a network connection to any public or private network. Generally, the network link 805 may be of any known networking technology known in the art.

The computing device 802 may have a processor 808 and a memory 810 accessible by the processor 808. Although the computing device 802 illustrated in FIG. 8 shows only one processor 808 and one memory 810, in some embodiments, the computing device 802 may have multiple processors 808 and/or multiple memories 810. Likewise, although the memory 810 is illustrated as being contained within the computing device 802, in some embodiments, the memory

810 may be located external to the computing device 802, but still may be remotely or locally accessible by the processor 808.

The computing device 802 may also be communicatively coupled, via a link 812, to a centralized process control system database 815, such as the database 28 of FIG. 1. In embodiments where the computing device 802 is an entity of a process control system, such as one of the workstations 20, 22 of FIG. 1, the computing device 802 may be coupled to the centralized process control database 815 via the data highway 24 of the system 10. In embodiments where the computing device 802 is not an entity of a process control plant but is communicatively coupled to a process control plant system, the computing device 802 may be coupled via the link 812 to an intermediate gateway (not shown) of the process control plant system 10 in order to communicate with the database 815 (e.g., in FIG. 1, communicate with the database 28 over the data highway 24). In some embodiments, the link 805 and the link 812 may be the same link, and in other embodiments, they may be different links.

Although the centralized database 815 of the process control system is represented in FIG. 8 as a single centralized database, reference 815 may represent more than one centralized database. For example, process control systems may include several databases in which process control data is recorded for historian purposes, such as a continuous history database, a discrete event database, and/or a batch historian database. The centralized database 815 may represent one or more historian databases used in a process control system. The centralized database 815 may include the dynamic hyperlink database 400 of FIG. 4. In a preferred embodiment, the dynamic hyperlink database may be logically independent from any configuration databases in the process control system.

The computing device 802 may encompass many different computing device configurations. For example, the computing device 802 may realized in hand-held devices, mobile phones, multi-processor systems, microprocessor-based or programmable consumer electronics, network PCs, mini-computers, mainframe computers, portable computing or communication devices, and or other computing devices capable of both visual display and direct or indirect communication with another computing device.

The computing device 802 may have a knowledge access provider 818 stored in the memory 810. The knowledge access provider 818 may be realized by computer-executable instructions, data structures, program modules, and other data that are stored on the memory 810 and are executable by the processor 808. In a distributed computing environment, the computer-executable instructions, data structures, program modules, etc. of the knowledge access provider 818 may be located in both local and remote memory storage devices, for example, in both a workstation 20, 22 of the process plant 10, and a computing device external to the process control plant system 10.

The knowledge access provider 818 may be enabled to provide embodiments of knowledge reference access and/or integration of the dynamic hyperlink into process control systems, as illustrated in FIGS. 2-7. For example, the knowledge access provider 818 may be enabled to create a dynamic hyperlink and store the dynamic hyperlink in an entry of a dynamic hyperlink database. The dynamic hyperlink database entry may contain at least an indication of a process control object and an indication of a knowledge object corresponding to a knowledge reference that are to be associated. The knowledge access provider 818 may establish a dynamic hyperlink between the indicated process control object and the indicated knowledge object at a run-time of a display view that includes a representation of the indicated process control object.

The knowledge access provider 818 may be enabled to provide embodiments of the dynamic hyperlink database 400 and administration thereof. For example, the dynamic hyperlink provider may provide search mechanisms for the database 400, population and deletion mechanisms, audit and repair functions, and the like. The knowledge access provider 818 may also be enabled to provide a set of administrative dynamic hyperlink operations with which to administer dynamically linked graphical messages in the process control system (e.g., create, delete, view modify, link, etc. and/or equivalents), including such dynamic hyperlink administrative operations as previously discussed.

In fact, the knowledge access provider 818 may be enabled to support any embodiments of integrating dynamic hyperlink into process control system display views, such as illustrated in FIGS. 3A-3C and FIGS. 5 and 6, any embodiments of the dynamically linked graphical message database 400 of FIG. 4, and any embodiments of the method 700 of FIG. 7. User interfaces to the knowledge access provider 818 may be provided via a user interface 820 such as a screen, keyboard, mouse, touch-screen, voice-activated user interface, or the like on the computing device 802.

Although the disclosure describes example methods and systems including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the disclosure describes example methods and apparatus, persons of ordinary skill in the art will readily appreciate that the examples provided are not the only way to implement such methods and apparatus.

When implemented, any of the computer readable instructions or software described herein may be stored in any computer readable storage medium or memory such as on a magnetic disk, a laser disk, or other storage medium, in a RAM or ROM of a computer or processor, portable memory, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method of providing dynamic access to knowledge references in a process control system, comprising:
presenting a first display view on a first screen of a first computing device and a second display view on a second screen of a second computing device in the process control system, wherein the first display view and the second display view comprise at least one process control element and wherein said at least one process control element is defined within the process control system;
enabling a user to store at least one entry in a dynamic hyperlink database, wherein the at least one entry corresponds to at least one defined dynamic hyperlink and wherein the entry comprises:
an indication of an association between said at least one process control element and said at least one defined dynamic hyperlink; and
an indication of an association between said at least one defined dynamic hyperlink and at least one knowledge object;
automatically establishing within the first display view, and independent of the second display view, based on the entry of the dynamic hyperlink database, which is accessed by the process control system during run-times of the first display view, an association between the defined dynamic hyperlink and the process control element, wherein the defined dynamic hyperlink enables the user to access a first knowledge object; and
automatically establishing within the second display view, and independent of the first display view, based on an entry of the dynamic hyperlink database, which is accessed by the process control system during run-times of the second display view, an association between the at least one defined dynamic hyperlink and the process control element, wherein the defined dynamic hyperlink enables the user to access a second knowledge object that is different than the first knowledge object.

2. The method of claim 1, further comprising:
automatically displaying a list of more than one dynamic hyperlink corresponding to the process control element within at least one of the first and second display views.

3. The method of claim 2, wherein displaying the list of the more than one dynamic hyperlink comprises displaying the list in conjunction with a display control corresponding to a search operation for the list.

4. The method of claim 1, wherein the at least one knowledge object comprises at least one of: a device reference material, a product data sheet, a specification sheet, an operating manual, a service manual, a customer documentation, a standard operating procedure, an incident report, a safety manual, a best practices document, a drawing, a loop sheet, a P&ID (Process and Instrumentation Diagram), a picture, an animated clip, a logbook entry, a note, a work order, a help topic, a display, a chart, or a second process control object.

5. The method of claim 1, wherein the process control element corresponds to one of: an area, a unit, a module, a block, a tag, a display, a chart, an alarm, a piece of equipment, a node, a device, a particular display view, or an event.

6. The method of claim 1, further comprising displaying the knowledge object within at least one of the first and second display views when the user activates the defined dynamic hyperlink.

7. The method of claim 1, wherein:
the process control element corresponds to a content of a particular knowledge object; and
displaying the defined dynamic hyperlink comprises displaying the defined dynamic hyperlink embedded within the content of the particular knowledge object.

8. The method of claim 7, wherein the embedded defined dynamic hyperlink links the particular knowledge object to real-time data so that a current value of the real-time data is displayed when the content of the particular knowledge object is displayed.

9. The method of claim 1, wherein accessing the first knowledge object or the second knowledge object comprises displaying the first knowledge object or the second knowledge object in conjunction with the user interface for editing the first knowledge object or the second knowledge object.

10. The method of claim 1, further comprising creating a new dynamic hyperlink, comprising, after presenting at least one of the first and second display views:
receiving an indication of a selected process control element;
displaying a list of available knowledge objects accessible by the process control system;
receiving an indication of a selected knowledge object from the list of available knowledge objects; and
defining the new dynamic hyperlink, including storing a new entry of the dynamic hyperlink database indicating the selected process control element and the selected knowledge object.

11. The method of claim 10, wherein creating the new dynamic hyperlink comprises creating the new dynamic hyperlink based on one of: a user selection of a menu item from a drop-down menu, a user selection of a display control, or a user-initiated drag-and-drop operation.

12. A method for providing dynamic hyperlinks within multiple displays in a process control system, comprising:
enabling a user to include at least one process control object within at least one first display view of multiple display views and to include the at least one process control object within at least one second display view of multiple display views, via a user interface, during creation of the multiple display views, via a display configuration interface;
enabling a user to store at least one entry in a dynamic hyperlink database, wherein the at least one entry corresponds to a defined dynamic hyperlink and wherein the entry comprises:
an indication of an association of the at least one process control object with the at least one defined dynamic hyperlink, and
an indication of an association of at least one knowledge object with said at least one defined dynamic hyperlink, wherein the at least one knowledge object corresponds with at least one knowledge reference;
automatically establishing, within the at least one first display view of the multiple display views, during run-time of the at least one first display view of the multiple display views, an association between the at least one process control object and the defined dynamic hyperlink, based on the at least one entry in the dynamic hyperlink database, wherein the defined dynamic hyperlink enables the user to access a first knowledge reference; and automatically establishing, within the at least one second display view of the multiple display views, independent from the at least one first display view of the multiple display views, during run-time of the at least one second display view of the multiple display views, an association between the at least one process control object and the defined dynamic hyperlink, based on the at least one entry in the dynamic hyperlink database, wherein the defined dynamic hyperlink enables the user to access a second knowledge reference that is different than the first knowledge reference, wherein the indication of the association of the at least one knowledge object with said at least one defined dynamic hyperlink is changed within the dynamic hyperlink database between the run-time of the at least one first display view and the run-time of the at least one second display view, and wherein the first display view and the second display view remain unchanged between the run-time of the at least one first display view and the run-time of the at least one second display view.

13. The method of claim 12, further comprising:
receiving an indication of a selection of the defined dynamic hyperlink;
accessing the knowledge reference; and
displaying the accessed knowledge reference.

14. The method of claim 12, further comprising updating the association between a specific process control object and a respective defined dynamic hyperlink, within the multiple display views, during run-times of the respective one of the multiple display views, based on a respective entry of the dynamic hyperlink database, when at least one of: one of a name or a location of the process control object is changed, or one of a name or a location of the knowledge object is changed within the dynamic hyperlink database.

15. The method of claim 12, wherein the at least one knowledge reference is stored external to a firewall of the process control system.

16. The method of claim 12, wherein the at least one knowledge reference is one of: a device reference material, a product data sheet, a specification sheet, an operating manual, a service manual, a customer documentation, a standard operating procedure, an incident report, a safety manual, a best practices document, a drawing, a loop sheet, a P&ID (Process and Instrumentation Diagram), a picture, an animated clip, a logbook entry, a note, a work order, a help topic, a particular display view, a chart, or a second process control object.

17. The method of claim 12, wherein defining the defined dynamic hyperlink comprises selecting the process control object from a list of available process control objects and selecting the at least one knowledge reference from a list of available knowledge references.

18. The method of claim 12, wherein defining the defined dynamic hyperlink comprises defining the defined dynamic hyperlink during a configuration of the process control object.

19. The method of claim 12, wherein the entry of the dynamic hyperlink database further includes an indication of an expiration time or an expiration time interval, wherein upon an expiration of the expiration time or the expiration time interval, the defined dynamic hyperlink is disabled and the entry is deleted from the dynamic hyperlink database.

20. The method of claim 12, further comprising storing an access permission corresponding to the defined dynamic hyperlink, wherein:

the access permission corresponds to an authorization level of the user or an authorization level of a group of users, and
the access permission indicates a permission to at least one of: create, view, modify or delete the defined dynamic hyperlink.

21. The method of claim 12, wherein the defined dynamic hyperlink is automatically established at the run-time of any display view without a configuration change or a download.

22. The method of claim 12, wherein the at least one process control object is a class object and the method further comprises:
automatically defining a sub-class dynamic hyperlink for each sub-class object of the class object, the sub-class dynamic hyperlink specifying an association between the each sub-class object and the at least one knowledge reference;
storing the sub-class dynamic hyperlink in another entry of the dynamic hyperlink database; and
establishing the sub-class dynamic hyperlink at the run-time of any display view that includes the each sub-class object.

23. The method of claim 12, further comprising, when a new process control object is defined in the process control system:
searching a list of available knowledge objects;
identifying a subset of the list of available knowledge objects corresponding to the new process control object;
defining a separate dynamic hyperlink for each of the subset of the list of available knowledge objects wherein the separate dynamic hyperlink associates the new process control object with the each of the subset of the list of available knowledge objects;
storing the separate dynamic hyperlink in the dynamic hyperlink database; and
establishing the separate dynamic hyperlink at the run-time of any display view that includes the new process control object.

24. The method of claim 12, wherein the dynamic hyperlink database is at least one of searchable or indexed.

25. The method of claim 12, further comprising providing a user interface for a set of dynamic hyperlink administrative operations, the set of dynamic hyperlink administrative operations including at least one of: create, define, delete, modify, view, search or link.

26. The method of claim 25, wherein providing the user interface comprises at least one of:
providing the user interface upon a selection of a specific process control object;
providing the user interface upon a selection of a specific knowledge object; or
providing the user interface via at least one of: a drop-down menu, a display control, or a drag-and-drop operation.

27. The method of claim 25, wherein providing the user interface for the set of dynamic hyperlink administrative operations comprises displaying the user interface for at least one of the set of dynamic hyperlink administrative operations based on at least one of: an authority level of the user, an authority level of a group to which the user belongs, a plant location, a plant area, a selected process control object subject, a workstation or computing device, or a selected knowledge object.

28. A dynamic knowledge access system within a process control system of a process control plant for providing access to knowledge references, the process control system having, a first computing device with a first processor, a second computing device with a second processor, a configuration database stored on a first centralized non-transitory computer-readable memory internal to a firewall of the process control system, the configuration database comprising at least one process control object, the knowledge access system comprising:
- a dynamic hyperlink database stored on a second centralized non-transitory computer-readable memory accessible to the process control system, wherein an entry of the dynamic hyperlink database corresponds to a specific dynamic hyperlink and wherein the entry includes:
  - an indication of an association between a process control object defined in the configuration database and the specific dynamic hyperlink; and
  - an indication of an association between the specific dynamic hyperlink and at least one knowledge object corresponding to a knowledge reference accessible by the process control system;
- multiple display views exhibited within the process control system, wherein the multiple display views include the process control object;
- a first knowledge access provider comprising computer-executable instructions stored on a non-transitory computer-readable memory of the first computing device and adapted to be executed by the first processor of the first computing device, the first knowledge access provider being enabled to:
  - automatically establish, within a first display view, during run-times of the first display view, based on the entry in the dynamic hyperlink database, an association between the specific dynamic hyperlink and the process control object that was entered within the first display view during configuration of the first display view, wherein the specific dynamic hyperlink enables a user to access a first knowledge reference; and
- a second knowledge access provider comprising computer-executable instructions stored on a non-transitory computer-readable memory of the second computing device and adapted to be executed by the second processor of the second computing device, the second knowledge access provider being enabled to:
  - automatically establish, within a second display view, during run-times of the second display view, based on the entry in the dynamic hyperlink database, and independent of the first display view, an association between the specific dynamic hyperlink and the process control object that was entered within the second display view during configuration of the second display view, wherein the specific dynamic hyperlink enables a user to access a second knowledge reference that is different than the first knowledge reference.

29. The knowledge access system of claim 28, further comprising an audit operation for the dynamic hyperlink database, wherein the audit operation ensures that for the each entry of the dynamic hyperlink database, a valid process control object and a valid knowledge object exist.

30. The knowledge access system of claim 28, wherein at least one knowledge reference is stored externally to the firewall of the process control system.

31. The knowledge access system of claim 28, wherein:
the process control object is a class object;
the dynamic hyperlink database includes an entry corresponding to each sub-class object of the class object; and
each entry corresponding to the each sub-class object includes an indication of the each sub-class object and an indication of the at least one knowledge object;
and the each entry of the each sub-class object is created in conjunction with a creation of the entry corresponding to the class object.

32. The knowledge access system of claim 28, wherein the knowledge access provider is further enabled to provide a user interface for editing the corresponding knowledge reference via a selection of the specific dynamic hyperlink.

33. The knowledge access system of claim 29, wherein the each entry of the dynamic hyperlink database further includes at least one of:
an expiration time, and after the expiration time expires, a corresponding dynamic hyperlink is disabled and the each entry is deleted from the dynamic hyperlink database;
an indication of at least one corresponding display view; or
an access permission.

34. The knowledge access system of claim 29, wherein the knowledge access provider is further enabled to, without re-configuring or downloading:
modify the respective entry of the dynamic hyperlink database corresponding to a selected dynamic hyperlink; and
update the display of the content of the corresponding knowledge reference based on the modification.

* * * * *